(12) United States Patent
Locke et al.

(10) Patent No.: US 9,074,053 B2
(45) Date of Patent: Jul. 7, 2015

(54) POLYMERIC COMPOSITION WITH ELECTROACTIVE CHARACTERISTICS

(71) Applicant: Mackinac Polymers LLC, Fort Myers, FL (US)

(72) Inventors: Ralph Locke, Fort Myers, FL (US); Michael Kerman, Romeo, MI (US); Melissa Arredondo, Burbank, CA (US); William Cowell, Commerce Township, MI (US)

(73) Assignee: Mackina Polymers, LLC, Fort Myers, FL (US)

( * ) Notice: Subject to any disclaimer, the term of this patent is extended or adjusted under 35 U.S.C. 154(b) by 0 days.

(21) Appl. No.: 14/215,803

(22) Filed: Mar. 17, 2014

(65) Prior Publication Data

US 2014/0316073 A1 Oct. 23, 2014

Related U.S. Application Data

(60) Provisional application No. 61/792,934, filed on Mar. 15, 2013.

(51) Int. Cl.
| | |
|---|---|
| *C08F 283/00* | (2006.01) |
| *C08G 75/14* | (2006.01) |
| *C09D 5/23* | (2006.01) |
| *C08G 18/83* | (2006.01) |
| *C08G 63/91* | (2006.01) |

(52) U.S. Cl.
CPC .................. *C08G 75/14* (2013.01); *C09D 5/23* (2013.01); *C08G 18/838* (2013.01); *C08G 63/91* (2013.01)

(58) Field of Classification Search
CPC ....... C08G 59/22; C08G 59/24; C07D 211/82
USPC ......................................... 525/418, 453, 535
See application file for complete search history.

(56) References Cited

U.S. PATENT DOCUMENTS

| | | | |
|---|---|---|---|
| 5,039,718 A | 8/1991 | Ashley et al. | |
| 7,745,528 B2 * | 6/2010 | Prud'Homme et al. | ...... 524/495 |
| 8,096,353 B2 | 1/2012 | Ver Meer | |
| 8,110,026 B2 * | 2/2012 | Prud'Homme et al. | ............ 96/4 |
| 2012/0068122 A1 * | 3/2012 | Kranbuehl et al. | ........... 252/503 |

FOREIGN PATENT DOCUMENTS

| | | |
|---|---|---|
| RU | 2476457 | 2/2013 |
| WO | 2012031183 | 3/2012 |

OTHER PUBLICATIONS

Patent Cooperation Treaty International Search Report and Written Opinion of the International Searching Authority for International Application No. PCT/US2014/028720, mailed on Oct. 16, 2014.

* cited by examiner

*Primary Examiner* — Terressa Boykin
(74) *Attorney, Agent, or Firm* — Young Basile Hanlon & MacFarlane PC

(57) ABSTRACT

A polymeric composition that includes at least one polymer and an effective amount of a nanoparticulate component. The nanoparticulate component is at least one of inorganic functional nanoparticulate compounds and graphene in which the nanoparticulate component is associated with the polymer. The polymer disclosed herein can have electromagnetic activity. The resulting polymeric composition exhibit a measurable electrical conductivity ($\sigma$) range of $10^{-14}$ to $4.7*10^6$ (S/m) at 20° C. A polymeric precursor that includes at least one component selected from the group that includes isocyanates, polyisocyanates, MDI-terminated prepolymers and an effective amount of a nanoparticulate component. The nanoparticulate component is at least one of inorganic functional nanoparticulate component being at least one of inorganic functional nanoparticulate compounds and graphene that is associated with the prepolymer.

31 Claims, 1 Drawing Sheet

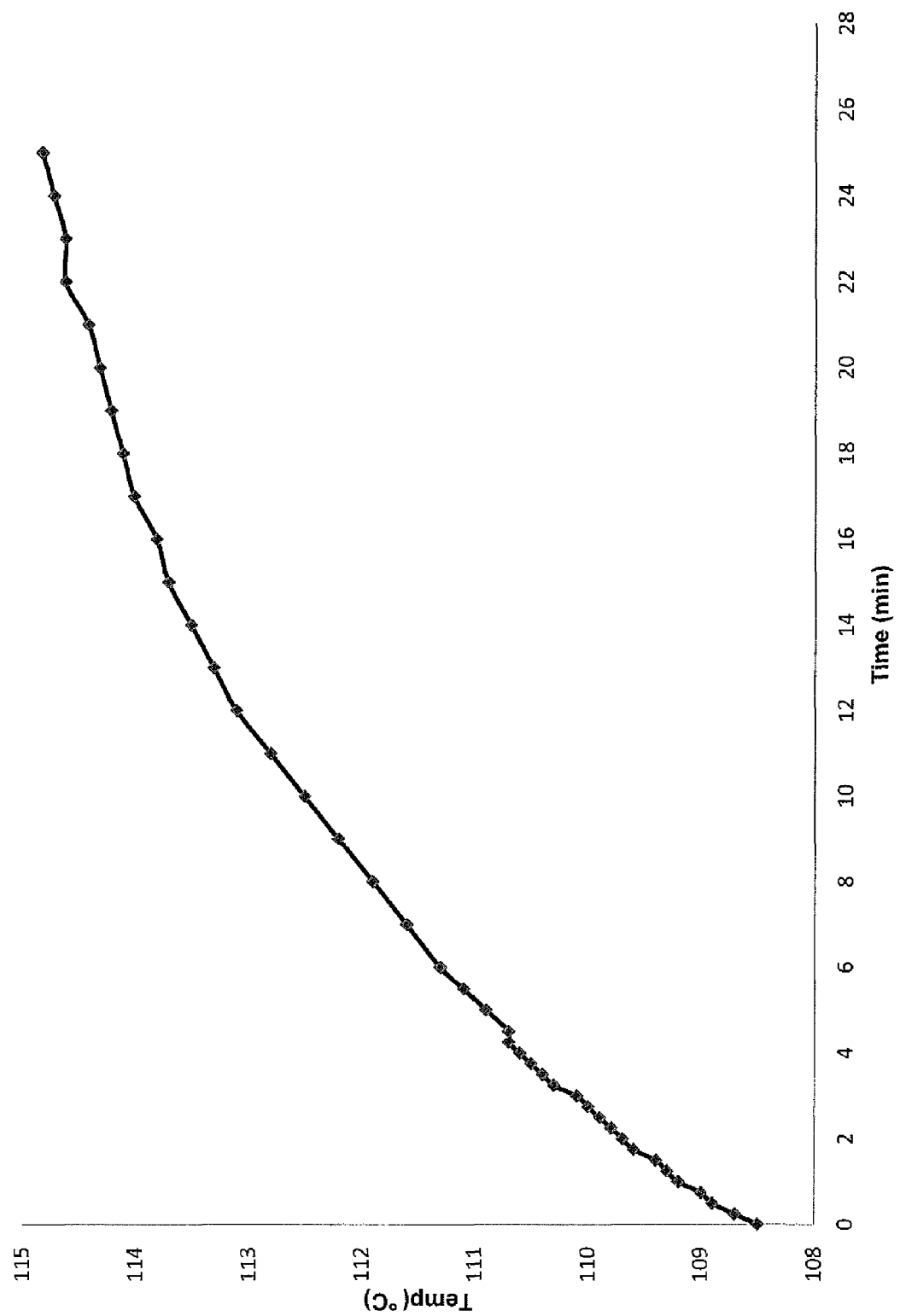

POLYMERIC COMPOSITION WITH ELECTROACTIVE CHARACTERISTICS

The present invention claims priority to U.S. Provisional Application No. 61/792,934 filed on Mar. 15, 2013 currently in this matter.

BACKGROUND

The present invention is directed to polymeric compositions, particularly to polymers and polymeric compositions that exhibit magnetic or electromagnetic characteristics. The present invention is also directed to polymers and polymeric compositions that incorporate nanoparticulate material either associated with the polymeric structure or incorporated into the polymeric structure itself.

The presence of fillers in a polymer resin can improve mechanical and chemical properties of the base material. For example, increasing the amount of fillers in epoxy systems and by using higher modulus fillers such as micron-size material such as silica, alumina, silicon carbide and the like can increase the modulus of the resulting composites. Filled or reinforced polymers have been used for many years in various applications such as synthetic rubbers, epoxy-fiberglass composites, paints and the like.

Fillers have also been used to provide or enhance conductive properties of various polymeric materials. However the ability to provide polymeric material that has ferroelectric properties has been limited. Therefore, it would be desirable to provide polymeric material that exhibits ferroelectric properties. It would also be desirable to provide a polymer or polymers incorporating nanoparticulate material in a manner that provides the polymeric material with the ability to exhibit magnetic or ferromagnetic qualities.

Therefore, there is a continuing need for polymers with improved properties including ferromagnetic properties. There is also a need for polymeric precursors that can be utilized to form various polymeric compounds.

SUMMARY

Disclosed herein is a polymeric composition that includes at least one polymer component and an effective amount of a nanoparticulate component. The nanoparticulate component is incorporated into the backbone or a side chain of the polymer component and includes at least inorganic functional nanoparticulate compound. The polymer disclosed herein can have electromagnetic activity. The resulting polymer may exhibit a measurable electrical conductivity ($\sigma$) range of $10^{-14}$ to $4.7*10^6$ (S/m) at 20° C. The polymeric component can include at least one of the following: polyester polyols, copolyesters, polyacrylates, polysulfides, olefins, polyamines, polyurethanes.

Also disclosed herein is a polymeric precursor that includes at least one polymeric component selected from the group that includes isocyanates, polyisocyanates, MDI-terminated prepolymers and an effective amount of a nanoparticulate component. The nanoparticulate component is at least one of an inorganic functional nanoparticulate component being at least one of an inorganic functional nanoparticulate compounds that is chemically bonded to the polymeric component of the prepolymer.

BRIEF DESCRIPTION OF THE DRAWINGS

In the present disclosure reference is made to the following various drawings in which like reference numerals are used for like elements throughout the various figures. The drawing figures are for illustrative purposes only and include the following:

FIG. 1 is directed to a typical exotherm predicted to be generated during polymerization reactions in the presence of nanoparticulate material.

DETAILED DESCRIPTION

Broadly disclosed herein, the present disclosure is directed to a polymeric composition that comprises at least one polymer component and an effective amount of a nanoparticulate component. The nanoparticulate component is at least one of an inorganic functional nanoparticulate compound or compounds and graphene. The nanoparticulate component is associated with the polymer in a manner that enhances at least one characteristic including but not limited to ferromagnetism, magnetism, conductivity and the like.

Without being bound to any theory, it is believed that the polymeric material disclosed herein can be composed of a network of nanoparticles that are integrated into the polymeric structure. Nanoparticles can be integrated into either the polymeric backbone, one or more side chains present in the polymeric structure or both. In certain instances, it is theorized that the network of nanoparticles can be homogeneous or essentially homogeneous.

Broadly disclosed, the present disclosure is directed to a polymeric composition that includes at least one polymer and an effective amount of a nanoparticulate component that is associated with the polymeric component. The nanoparticualte component can be at least one of a nanofunctional nanoparticulate compound and/or graphene. The nanofunctional nanoparticulate component can be a mixture of organofunctional nanoparticulate compounds inorganic functional nanoparticulate compound(s) and/or graphene.

As defined herein, the term "associated with the at least one polymer component" can include situations in which the nanoparticulate component is integrated into interpenetrating networks present in the polymeric compound as formed. It is also contemplated that the nanoparticulate component can be integrated into the backbone of the polymer and/or integrated into one or more side chains present in the polymer.

Non-limiting examples of polymers suitable for use in the polymeric composition disclosed herein include one or more of the following: polyester polyols, copolyesters, polyacrylates, unsaturated polyesters, polyamines and polysulfides as well of mixtures of any of the foregoing. The polymer employed in the composition can have any suitable molecular weight. In certain embodiments, the polymer present in the polymeric composition as can have a molecular weight between about 2000 and 150000. In certain embodiments, it is contemplated that the polymer can have a molecular weight between about 4000 and 12000.

In other embodiments, it is contemplated that the polymer can be a two-part thermosetting material, examples of which include but are not limited to polysulfides, polyacrylates, polyurethanes and the like. The thermosetting polymer can have a suitable molecular weight such as between about 100 and 150000. In certain embodiments, it is contemplated that the polymer can have a molecular weight between about 1000 and 18000.

It is contemplated that the materials and methods disclosed herein can be effectively employed with various thermosetting polymers and their thermoplastic analogs. Thus, polyolefin-based materials and other thermoplastic materials are to be considered within the purview of this disclosure.

The nanoparticulate component can be composed of one or more organometallic compounds that are present with or without graphene. In certain embodiments, it is also contemplated that the nanoparticulate component can be composed solely of graphene. In addition to graphene, non-limiting examples of materials suitable for use as the nanoparticulate component include an inorganic salt or inorganic salts that contain a cationic component. Suitable cationic components include one or more of the following: Fe II, Fe III, Cu I, Cu II, Pb II, Pb IV, Au I, Au III, Ni I, Ni II, Ni III, Ni IV, Co II, Co III, Mn II Mn III, Mn IV, Mn V, Mn VI, Mn VII. These materials can be used individually or in various combinations. In certain embodiments of the polymeric composition as disclosed herein, the nanoparticulate component can be at least one of the following: ferrite nanoparticles, alnico nanoparticles, rare earth magnetic nanoparticles. Non-limiting examples of rare earth magnetic nanoparticles include materials such as neodymium and/or samarium-cobalt. These materials can be used individually or in any suitable combination. In certain embodiments, the anionic portion of the nanoparticulate component can be may be one that is selected from the group that includes oxides, hydroxides, carboxylates, nitrogen anions.

Inorganic nanoparticulate materials can also be classified as ferromagnetic nanoparticles, ferrimagnetic nanoparticles, or antiferrimagnetic nanoparticles. Without being bound to any theory, it is believed that ferromagnetic nanoparticles are materials that have permeabilities greater than unity and demonstrate increasing magnetization with an applied magnetizing field. The effect is caused by the alignment of electron spin in regions called domains. Ferrimagetic nanoparticles are those, like ferromagnetic particles, that hold spontaneous magnetization below the Curie temperature but show no magnetic order (i.e. are paramagnetic) above this temperature. In ferromagnetic material, the magnetic moments of the atoms on different sublattices are opposed with the opposing moments being unequal such that when the opposing moments are unequal, a spontaneous magnetization remains. This can occur when the sublattices consist of different materials or ions such as $Fe^{2+}$ and $Fe^{3+}$. Non-limiting examples of ferromagnetic materials include various ferrites as well as magnetic garnet material, for example yttrium iron garnet and ferrites composed of iron oxides as well as other elements such as aluminum, cobalt, nickel, manganese and zinc.

For purposes of this disclosure, antiferrimagnetic materials are considered to be those in which the magnetic moments of the atoms or molecules align in a regular pattern with neighboring spins on different sublattices exhibiting a generally ordered magnetism. Non-limiting examples of material exhibiting antiferrimagnetic characteristics can be transition metal compounds, especially oxides. Specific materials can include, but are not limited to, hematites, metals such as chromium, and various alloys such as iron manganese as well as oxides such as nickel oxide.

"Graphene", as that term is used herein, is defined as a substance composed of pure carbon arranged in a regular hexagonal pattern similar to graphite but in a one-atom thick sheet present in nanoparticulate scale. Various analogs of graphene can also be successfully employed in various embodiments of the material disclosed herein. Non-limiting examples of suitable analogs include silicon analogs such as silicone. It is also contemplated that various organometallic compounds can be employed include, but are not limited to, various metallocenes such as ferrocene, cobaltocene and the like. Also suitable for use in the material are various oxides, hydroxides as well as mixtures of the two. Non-limiting examples of suitable oxides are $FeO$, $Fe_2O_3$, $Fe_3O_4$ and the like. Non-limiting examples of various hydroxides include hydroxides of Fe, Cu, Pb, Ni, and Co.

The nanoparticulate material can have a particle size less than 100 nm. In certain specific embodiments, the nanoparticulate material can have a particle size less than about 50 nm. In other embodiments, the nanoparticulate material can have a particle size less than about 20 nm. The nanoparticulate compound can be functionalized from within the polymer matrix with a suitable functionalizing compound if desired or required. Suitable functionalizing compounds can be one or more of the following: carboxylic acid compounds, hydroxyl compounds, acrylic compounds, amine compounds, sulfide compounds, epoxide compounds, carbonyl compounds and the like. Where desired or required, the nanoparticulate material can be present as monolayer protected clusters. In certain embodiments, the nanoparticualte component can have an average size between 1 nm and 100 nm and can be functionalized with at least one of the following: hydroxyl groups, animo groups, carboxylic acid groups, mercapto groups, isocyanate groups, acrylate groups, carbonyl groups, halide groups, silane groups.

The nanoparticulate material can be chemically bonded to at least one polymer component in the composition. In certain embodiments, it is contemplated that nanoparticulate material can be integrated into either the polymeric backbone and/or polymeric side chains of the polymeric component. The nanoparticulate material will be present in the associated composition in an amount sufficient to provide a composition having an electromagnetic activity in a range between 1 emu/gram and about 50 emu/gram. In certain embodiments, the nanoparticulate material will be present in an amount sufficient to provide a measurable electrical conductivity (σ) range of $1*10^{-14}$ to $4.7*10^6$ (S/m) at 20° C.

Without being bound to any theory, it is believed that in certain embodiments, the nanoparticulate material integrates in the polymer in one of the following manners:

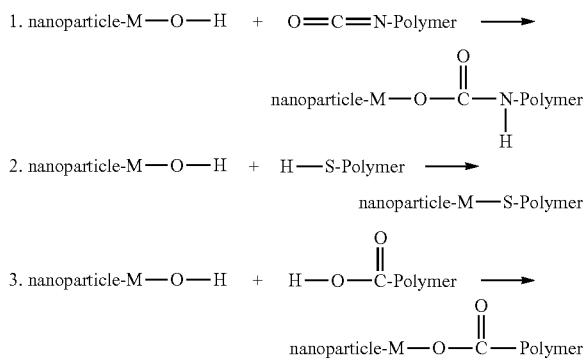

* M can be Fe, Mn, Cu, Pb, Ni on the surface of a nanoparticle

The nanoparticles can have various functionalized monolayers which can lead to various reaction products depending on the polymer employed. The following are non-limiting representative examples:

Functionalized Monolayers on Nanoparticles and Reaction Examples

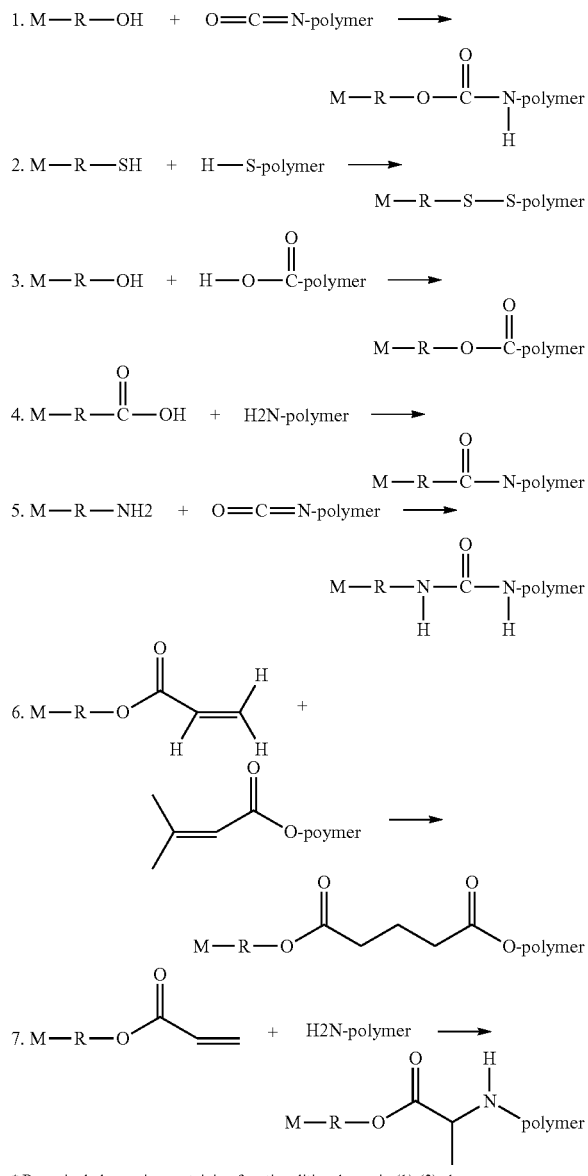

\* R can include species containing functionalities shown in (1)-(3) above

The present disclosure also contemplates a polymeric precursor that includes at least one component selected from the group including isocyanates, polyisocyanates, MDI-terminated prepolymers; and an effective amount of a nanoparticulate component, the nanoparticulate component being at least one of graphene and/or inorganic functional nanoparticulate associated with the polymer. The nanoparticualte component can be functionalized if desired or required. For example, the nanopartulate compound can be functionalized with at least one of hydroxyl compounds, amine compounds, carboxylic acid compounds, mercapto compounds, isocyanate compounds, acrylate compounds. It is also contemplated that the nanoparticulate component can be present in the polymeric precursor composition as monolayer protected clusters.

In certain embodiments, it is contemplated that the nanoparticualte component of the polymeric precursor can include at least one of graphene and/or an inorganic salt containing an cationic component. The cationinc component can include at least one of the following: Fe II, Fe III, Cu I, Cu II, Pb II, Pb IV, Au I, Au III, Ni I, Ni II, Ni III, Ni IV, Co II, Co III, Mn II, Mn III, Mn IV, Mn V, Mn VI, Mn VII as well as mixtures of the foregoing.

In order to better understand the invention disclosed herein, the following examples are presented. The examples are to be considered illustrative and are not to be viewed as limiting the scope of the present disclosure or claimed subject matter.

EXAMPLE I

In order to ascertain whether nanoparticulate materials and/or graphene can be successfully incorporated into various polymeric compounds to produce materials with novel electric or magnetic characteristics, various polymeric formulations are investigated. The materials to be investigated will be polyurethanes, nitrile formulations etc.

Various polyester formulations can be prepared. For example Formulations 1 and 2 can be formed by the melt mix reaction of the components outlined Table I and II performed under neutral atmosphere or vacuum for an interval of about 2 hours. The resulting materials have a Shore A value of between 41 and 48 when fully cured.

TABLE I

| Reaction Formulation 1 | |
| --- | --- |
| Material | Amount |
| Dynacol 7130 | 29.2 gm |
| Dynacol 7360 | 29.2 gm |
| Dynacol 7250 | 29.2 gm |
| 4,4' MDI | 12.4 gm |

It is believed that Dynacol 7130 is an amorphous copolyester with a MW in the range of 2,000 to 5,500 and a glass transition temperature, $T_g$, in the range of 10-50° C. Backbones of these copolyesters often contain blends of diacids including, terephthalic, iosphthalic, phtalic and adipic acids and diols including, ethylene glycol, neopentyl glycol, hydroxypivalate, pentane, and 1,4 diol/hexanediol. Dynacol 7360 is believed to be a liquid coplyester with a MW in the range of 3,500 to 5,500 and a glass transition temperature, $T_g$, in the range of −50 to −10° C. Backbones of these copolyesters often contain blends of diacids including, terephthalic, phtalic, and adipic acids and diols including 2-methylbutanediol, ethylene glycol, neopentyl glycol, and hexanediol. Dynacol 7250 is believed to be a crystalline solid copolyester with a MW in the range of 2,000 to 8,500 and glass transition temperature, $T_g$, in the range of −60 to −20° C. Backbones of these copolyesters often contain blends of diacids including, dodecanoic, iosphthalic, phtalic, azelic and adipic acids and diols including hexanediol, ethylene glycol.

TABLE II

| Reaction Formulation 2 | |
| --- | --- |
| Material | Amount |
| Dynacol 7130 | 28.8 gm |
| Dynacol 7340 | 28.8 gm |
| Dynacol 7210 | 28.8 gm |
| 4,4' MDI | 13.6 gm |

Dynacol 7340 is believed to be a linear copolyester having a hydroxyl number 27-34 mg KOH/g and acid number of 2 mg KOH/g molecular weight of 3500 and a density of 1.19 kg/dm$^3$. Dynacol 7210 is believed to be an linear copolyester having a hydroxyl number 27-34 mg KOH/g, an acid number of 2 mg KOH., a molecular weight of 3500 g/mol and a density at 23 degrees of 1.29 kg/dm$^3$.

Multiple versions of the formulations in Tables I and II are prepared. The Dynacol materials are heated to 110° C. under nitrogen and mixed slowly for 20 minutes. After 20 minutes a respective measures portion of one of the following additives is added to a given formulation sample: graphene at grades H-15, M-15 and C-500 respectively, as well as iron oxide nanoparticles present as $Fe_2O_3$ or $Fe_2O_4$, after which time the heat input is discontinued.

4,4" MDI is added after heat addition is discontinued. The reaction temperature is monitored and not allowed to exceed 130° C. The reaction is permitted to proceed to completion (about 2 hours) while the reaction temperature is maintained between 110° C. and 130° C. The reaction temperature remains steady and no exotherm is predicted during the reaction time.

EXAMPLE II

Formulation 2 is prepared with the addition of nanoparticulate material. This is accompanied by an observed exothermic spike associated with the addition of the nanoparticulate occurring prior to the addition of the MDI. Reaction temperatures of between 110° C. and 130° C. are maintained during the addition of the MDI. However the termperature spiek observed during addition of the nanoparticles indicated an exothermic reaction. It is believed that the introduced nanoparticles are reacting with the polymeric components, for example the polymeric co-esters as the polymer is being formed indicating that at least a portion of the nanoparticulate material is integrated into the backbone of the polymer as it is formed. It is hypothesized that the nanoparticulate material is integrated in to the polymer in a generally homogeneous or near homogeneous fashion. A representative exotherm prediction is set forth in FIG. 1.

TABLE III

Reaction Formulation 3

| Material | Amount |
| --- | --- |
| Dynacol 7130 | 10.36 gm |
| Dynacol 7340 | 10.36 gm |
| Dynacol 7210 | 10.36 gm |
| 4,4' MDI | 139.9 gm |
| $Fe_3O_4$ (5%) less than 50 nm | 56.3 gm |

EXAMPLE III

The results of Example II are replicated using the materials set forth in Table III. The Dynacol materials are heated to 110° C. under nitrogen for 20 minutes. Once the material is molten, the heating progresses with steady mixing. After this, $Fe_3O_4$ (5%) nanoparticles having an average particle size less than 50 nm are added under nitrogen with mixing. Once added, the resulting material is mixed for 20 minutes after which the heating is discontinued and temperatures recorded prior to addition of MDI. The MDI is added and the temperature is not allowed to exceed 130° C. during a mix/reaction interval of 2 hours.

EXAMPLE IV

Two-part polysulfide evaluated for use in the composition disclosed herein. The components and amounts of the paste component are set forth in Table IV. The defoaming agent Airex 900 is added to the Santizer component and mixed for about 5 minutes. When this step is completed, the diphenylguanidine component is added to the composition in powder form and is mixed to ensure proper distribution throughout the material. Magnesium oxide can be added in small additions allowing at least one minute between additions with additional mixing after completed magnesium oxide addition together with degassing. The resulting material is a homogeneous paste or liquid. The polysulfide resin can be prepared by admixing the materials set forth in Table V. The prepared nanoparticulate can be added to the resin component in multiple portions with shear mixing for approximately 80 minutes under a nitrogen blanket. It is believed that material such as Santicizer are plasticizers or softening agents that result in the lowering of the glass transition termperature $T_g$ of the associated material. It is believed that Airex 900 is a defoamer/air release additive typically based on silicone chemistry. It is believed that the Thioplast G10 is a polysulfide with a MW between 4400-4700 and with approximately 1.5% mercaptan and Thioplast G44 is a polysulfide with a MW lower than 1100 and with a greater than 5.9% mercaptan content.

The two components can be admixed at a ratio of 10 parts paste to 100 parts resin component with stirring for about three minutes. The material can be caste on a suitable release surface and allowed to polymerize.

TABLE IV

Polysulfide paste component

| Material | Amount |
| --- | --- |
| Santicizer | 141 gm |
| Airex 900 | 9.6 gm |
| Diphenylguanidine | 8.4 gm |
| Manganese Oxide FA | 141 gm |

TABLE V

Polysulfide resin component

| Material | Amount |
| --- | --- |
| Thioplast G10 | 714 gm |
| Thioplast G44 | 9.6 gm |

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:
1. A polymeric composition comprising:
   at least one polymer component, wherein the at least one polymer component has a backbone, the polymeric component including at least one of the following: polyester polyols, copolyesters, polyacrylates, polysulfides, olefins, polyamines, polyurethanes; and a nanoparticulate component incorporated into the backbone or a side chain present in the polymer component, wherein the nanoparticulate component is at least one inorganic functional nanoparticulate compound, wherein the nanoparticulate component is present in an amount sufficient to provide at least one of the following: an electrical conductivity ($\sigma$) in a range between $1*10^{-14}$ and $4.7*10^6$ (S/m) at 20° C.; an electromagnetic activity between 1 emu/gram and about 50 emu/gram.

2. The polymeric composition of claim 1 wherein the nanoparticulate component is present in an amount between about 0.1% and about 50% by weight of the polymer.

3. The polymeric composition of claim 2 wherein the nanoparticulate component is present in an amount between about 1.0% by weight and about 50% by weight of the polymer.

4. The polymeric composition of claim 2 wherein the nanoparticulate component is present in an amount between about 3.0% by weight and about 50% by weight of the polymer, wherein the polymer component is either a thermoplastic material or a thermosetting material.

5. The polymeric composition of claim 1 wherein the nanoparticulate component is present in the composition as monolayer protected clusters.

6. The polymeric composition of claim 2 wherein the nanoparticulate component includes at least one of the following: an inorganic salt containing a cationic component selected from the group consisting of Fe II, Fe III, Cu I, Cu II, Pb II, Pb IV, Au I, Au III, Ni I, Ni II, Ni III, Ni IV, Co II, Co III, Mn II, Mn III, Mn IV, Mn V, Mn VI, Mn VII, and mixtures thereof; ferrite nanoparticles, alnico nanoparticles, rare earth magnetic nanoparticles.

7. The polymeric composition of claim 1 wherein the nanoparticulate components are selected from the group consisting of ferromagnetic materials, ferromagnetic materials, antiferrimagnetic materials and mixtures thereof.

8. The polymeric composition of claim 6 wherein the rare earth magnetic material is selected from the group consisting of neodymium and/or samarium-cobalt.

9. The polymeric composition of claim 6 wherein the nanoparticulate component has an anionic portion selected from the group consisting of oxides, hydroxides and mixtures thereof.

10. The polymeric material of claim 2 wherein the nanoparticulate component is selected from the group consisting of FeO, $Fe_2O_3$, $Fe_3O_4$, ferrocene, cobaltocene and mixtures thereof.

11. The polymeric composition of claim 1 wherein the nanoparticulate component has an average particle size less than 100 nm.

12. The polymeric composition of claim 1 wherein the nanoparticulate component has an average particle size less than 50 nm.

13. The polymeric composition of claim 1 wherein the nanoparticulate component has an average size less than 20 nm.

14. The polymeric composition of claim 1 wherein the nanoparticulate component is functionalized from within the polymer with at least one of the following: carboxylic epoxide compounds, carbonyl compounds.

15. A polymeric composition comprising:
at least one polymer component selected from the group including at least one of polyester polyols, copolyesters, polyacrylates, polysulfides, polyurethanes, the polymeric component having a backbone; and
at least one nanoparticulate component, wherein the nanoparticulate component is at least one inorganic transition metal nanoparticulate compounds, and wherein the inorganic transition metal nanoparticulate component is chemically bonded to the backbone of the polymer component, wherein the nanoparticulate compound is present in an amount sufficient to provide at least one of following: electrical conductivity ($\sigma$) in a range of $1*10^{-14}$ to $4.7*10^6$ (S/m) at 20° C.; an electromagnetic activity in a range between 1 emu/gram and about 50 emu/gram.

16. The polymeric composition of claim 15 wherein the nanoparticulate component is present in an amount between 1 and 50% by weight of the total polymer composition.

17. The polymeric composition of claim 15 wherein the nanoparticulate component is present in an amount between 5 and 30% by weight of the total polymer composition.

18. The polymeric composition of claim 17 wherein the nanoparticulate component is selected from the group consisting of $Fe_2O_3$, $Fe_3O_4$, ferrocene, cobaltocene and mixtures thereof.

19. The polymeric composition of claim 17 wherein the nanoparticulate component has a an average size between 1 nm and 100 nm and is functionalized with at least one of the following: hydroxyl groups, amino groups, carboxylic acid groups, mercapto groups, isocyanate groups, acrylate groups, carbonyl groups, halide groups, silane groups.

20. The polymeric composition of claim 15, wherein the nanoparticulate component has a an average size between 1 nm and 50 nm.

21. A polymeric precursor comprising:
at least one polymeric component selected from the group including isocyanates, polyisocyanates, MDI-terminated prepolymers; and
a nanoparticulate component, the nanoparticulate component being an inorganic functional transition metal nanoparticulate component chemically bonded to the at least one polymeric component.

22. The polymeric precursor of claim 21 wherein the nanoparticulate component is functionalized with at least one of hydroxyl compounds, amine compounds, carboxylic acid compounds, mercapto compounds, isocyanate compounds, acrylate compounds.

23. The polymeric precursor of claim 21 wherein the nanoparticulate component is present in the composition as monolayer protected clusters.

24. The polymeric precursor of claim 21 wherein the inorganic functional transitional metal nanoparticulate component is an inorganic salt containing a cationic component selected from the group consisting of Fe II, Fe III, Cu I, Cu II, Pb II, Pb IV, Au I, Au III, Ni I, Ni II, Ni III, Ni IV, Co II, Co III and mixtures thereof.

25. The polymeric precursor of claim 21 wherein the nanoparticulate component is a ferromagnetic material selected from the group consisting of ferrite materials, alnico materials, rare earth magnetic materials and mixtures thereof.

26. The polymeric precursor of claim 21 wherein the nanoparticulate component has an anionic portion selected from the group consisting of oxides, hydroxides and mixtures thereof.

27. The polymeric precursor of claim 21 wherein the nanoparticulate component is selected from the group consisting of $Fe_2O_3$, $Fe_3O_4$, ferrocene, cobaltocene and mixtures thereof.

28. The polymeric precursor of claim 21 wherein the nanoparticulate component has an average particle size of 50 nm or less.

29. The polymeric precursor of claim 28 wherein the nanoparticulate component has an average particle size between about 0.1 nm to about 15 nm.

30. The polymeric precursor of claim 27 wherein the nanoparticulate component has an average particle size between about 0.1 nm to about 5 nm.

31. The polymeric precursor of claim 21 wherein the composition has an electromagnetic activity of 1 emu/gram to 50 emu/gram.

* * * * *